United States Patent
Luoma et al.

(10) Patent No.: US 10,237,679 B2
(45) Date of Patent: Mar. 19, 2019

(54) METHOD, APPARATUS, AND COMPUTER PROGRAM PRODUCT FOR LOCATION SHARING

(75) Inventors: Kristian Luoma, Kiviniemi (FI); Mikko Blomqvist, Tampere (FI); Jukka Alakontiola, Oulu (FI); Marcel Duee, Berlin (DE)

(73) Assignee: HERE Global B.V., Eindhoven (NL)

( * ) Notice: Subject to any disclaimer, the term of this patent is extended or adjusted under 35 U.S.C. 154(b) by 3070 days.

(21) Appl. No.: 12/147,554

(22) Filed: Jun. 27, 2008

(65) Prior Publication Data

US 2009/0326811 A1 Dec. 31, 2009

(51) Int. Cl.
*H04W 4/02* (2018.01)
*H04L 29/08* (2006.01)
*H04W 4/021* (2018.01)
*H04W 64/00* (2009.01)

(52) U.S. Cl.
CPC .............. *H04W 4/02* (2013.01); *H04L 67/18* (2013.01); *H04W 4/021* (2013.01); *H04W 64/00* (2013.01)

(58) Field of Classification Search
CPC ....... H04W 4/02; H04W 4/021; H04W 64/00; H04L 67/18
USPC .... 701/207, 208, 409; 455/11.1, 411, 456.1, 455/456.6
See application file for complete search history.

(56) References Cited

U.S. PATENT DOCUMENTS

| 5,565,909 | A | * | 10/1996 | Thibadeau et al. | 725/35 |
| 6,360,101 | B1 | * | 3/2002 | Irvin | 455/456.6 |
| 6,477,353 | B1 | * | 11/2002 | Honda et al. | 455/11.1 |
| 6,751,626 | B2 | * | 6/2004 | Brown et al. | |
| 7,006,835 | B2 | * | 2/2006 | Otsuka et al. | 455/456.1 |
| 7,026,983 | B2 | * | 4/2006 | Spratt | 342/357.25 |
| 2003/0008672 | A1 | * | 1/2003 | Fujii | 455/456 |
| 2003/0104824 | A1 | * | 6/2003 | Hale et al. | 455/456 |
| 2005/0079873 | A1 | | 4/2005 | Caspi et al. | |
| 2007/0264974 | A1 | | 11/2007 | Frank et al. | |

(Continued)

FOREIGN PATENT DOCUMENTS

CA 2 615 202 6/2008

OTHER PUBLICATIONS

Search Report and Written Opinion for PCT/FI2009/050408 dated Sep. 17, 2009.

(Continued)

*Primary Examiner* — Jaime Figueroa
(74) *Attorney, Agent, or Firm* — Alston & Bird LLP (57) ABSTRACT

An apparatus for location sharing may include a processor. The processor may be configured to access a point of interest and a geographic cell associated with the point of interest. In this regard, the geographic cell may include geographic cell boundaries. The processor may also be configured to receive location information. The location information may describe a location of a device. The processor may be further configured to determine whether the location described by the location information is within the geographic cell boundaries and associate the device with the point of interest in response to the location described by the location information being within the geographic cell boundaries. The processor may also be configured to share the association between the device and the point of interest via an online service. Associated methods and computer program products may also be provided.

20 Claims, 7 Drawing Sheets

(56) References Cited

U.S. PATENT DOCUMENTS

2008/0019317 A1* 1/2008 Vellanki et al. ............ 370/331
2008/0032703 A1* 2/2008 Krumm et al. ............ 455/456.1
2008/0214204 A1* 9/2008 Ramer et al. ............ 455/456.1

OTHER PUBLICATIONS

Extended European Search Report for corresponding European Application No. 09769405.3, dated Apr. 28, 2015, 6 pages.
Office Action for Chinese Application No. 201610279850.9 dated Jul. 2, 2018, 12 pages.
Intention to Grant for European Application No. 09 769 405.3 dated Jul. 11, 2018, 7 pages.
Office Action for Chinese Application No. 200980123684.1 dated Feb. 28, 2013, 4 pages.
Office Action for Chinese Application No. 200980123684.1 dated Feb. 17, 2014, pages.
Office Action for Chinese Application No. 200980123684.1 dated Aug. 14, 2014, 6 pages.
Office Action for Chinese Application No. 200980123684.1 dated Dec. 3, 2014, 7 pages.
Re-Examination Decision for Chinese Application No. 200980123684.1 dated Jan. 28, 2016, 22 pages.
Re-Examination Decision for Chinese Application No. 200980123684.1 dated Mar. 25, 2016, 6 pages.
Office Action for Chinese Application No. 201610279850.9 dated Dec. 12, 2018, 10 pages.

* cited by examiner

METHOD, APPARATUS, AND COMPUTER PROGRAM PRODUCT FOR LOCATION SHARING

TECHNICAL FIELD

Embodiments of the present invention relate generally to communicating information and, more particularly, relate to an apparatus, method and a computer program product for sharing information regarding the location of a device.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices and other computing devices. However, as the ease of information transfer increases, users continue to demand more and different types of data. Mobile devices, networks, personal computers, and other computing devices can now capture numerous types of information about users and their activities. Such information may include location information, phone call information (e.g., what contacts were called, duration of calls, what calls were received), status information (e.g., working, sleeping, watching a movie), media information (e.g., recent photographs taken, music played), etc. The availability of this information is desirable to users, not only with respect to information about themselves and their own activities, but also with respect to their friends and business contacts.

Currently, these and other types of information are being captured by various computing devices, but the information is often used ineffectively, possibly because no common outlet for the information is available to users. Further, due to the lack of a common outlet for the information, the information may not be shared with other users on a network. As such, users may not consider, utilize, or interact with the information to, for example, make decisions regarding the activities performed by the users.

BRIEF SUMMARY

A method, apparatus, and computer program product are described that provide for location sharing. Some exemplary embodiments of the present invention may share the location of a user's device (e.g., a mobile terminal or the like) with an online service. The online service may then share the location of the user's device with other users of the online service. In this regard, in some exemplary embodiments, the exact location of the user's device (e.g., longitude and latitude, physical address, or the like) need not be provided, but rather location sharing may be provided with respect to a predetermined point of interest (e.g., work, home, amusement park, London, California, or the like). Further, a point of interest association to the device may be shared.

Accordingly, in one exemplary embodiment, a method for location sharing is described. The method may include accessing a first point of interest, a name of the first point of interest and/or a first geographic cell associated with the first point of interest. In this regard, the first geographic cell may include first geographic cell boundaries. The method may also include receiving location information. The location information may describe a location of a device. The method may further include determining whether the location described by the location information is within the first geographic cell boundaries and associating the device with the first point of interest in response to the location described by the location information being within the first geographic cell boundaries. The method may also include sharing the name of the first point of interest and/or the association between the device and the first point of interest in response to the location described by the location information being within the first geographic cell boundaries.

In another exemplary embodiment, an apparatus for location sharing is described. The apparatus may include a processor that may be configured to access a first point of interest, a name of a first point of interest, and/or a first geographic cell associated with the first point of interest. In this regard, the first geographic cell may include first geographic cell boundaries. The processor may also be configured to receive location information. The location information may describe a location of a device. The processor may be further configured to determine whether the location described by the location information is within the first geographic cell boundaries and associate the device with the first point of interest in response to the location described by the location information being within the first geographic cell boundaries. The processor may also be configured to share the name of the first point of interest and/or the association between the device and the first point of interest in response to the location described by the location information being within the first geographic cell boundaries.

In another exemplary embodiment, a computer program product for providing service invitations is described. The computer program product may include at least one computer-readable storage medium having computer-readable program code instructions stored therein. The computer-readable program code instructions may include first program code instructions, second program code instructions, third program code instructions, fourth program code instructions, and fifth program code instructions. The first program code instructions may be configured to access a first point of interest, a name of a first point of interest, and/or a first geographic cell associated with the first point of interest. In this regard, the first geographic cell may include first geographic cell boundaries. The second program code instructions may be configured to receive location information. The location information may describe a location of a device. The third program code instructions may be configured to determine whether the location described by the location information is within the first geographic cell boundaries and the fourth program code instructions may be configured to associate the device with the first point of interest in response to the location described by the location information being within the first geographic cell boundaries. The fifth program code instructions may be configured to share the name of the first point of interest and/or the association between the device and the first point of interest in response to the location described by the location information being within the first geographic cell boundaries.

In yet another exemplary embodiment, an apparatus for location sharing is described. The apparatus may include means for accessing a first point of interest, a name of a first point of interest, and/or a first geographic cell associated with the first point of interest. In this regard, the first geographic cell may include first geographic cell boundaries. The apparatus may also include means for receiving location information. The location information may describe a location of a device. The apparatus may further include means for determining whether the location described by the location information is within the first geographic cell boundaries and means for associating the device with the first point of interest in response to the location described by the location information being within the first geographic cell boundaries. The apparatus may also include means for sharing name of the first point of interest and/or the association between the device and the first point of interest in response to the location described by the location information being within the first geographic cell boundaries.

Exemplary embodiments of the invention may provide a method, apparatus, and computer program product for employment, for example, in mobile environments. As a result, in some exemplary embodiments, information such as point of interest associations may be shared across mobile environments with other users via an online service.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Moreover, the term "exemplary," as used herein, is not provided to convey any qualitative assessment, but instead to merely convey an illustration of an example.

Embodiments of the present invention may be employed to, for example, receive location information associated with a device, and associate the device with a predefined point of interest based on the location information. In this regard, the device may be associated with a predefined point of interest, when the location described by the location information falls within predefined geographic cell boundaries associated with the point of interest. In this regard, the association of a device to a point of interest, when the location information of the device is located within the geographic cell boundaries associated with the point of interest may be referred to as a point of interest association. Once associated, various embodiments of the present invention may share, via, for example, an online service, the point of interest association with other users of the online service. In this regard, the location of the device may also be associated with a user (e.g., the user likely carrying or otherwise collated with the device), and as such, the point of interest association may also indicate the presence or location of the user with respect to the point of interest. Further, by accessing the online service a first user may be able to view information regarding a second user, including information with regard to point of interest associations of the second user. For example, the point of interest associations may be used to present a message, such as, for example, "Second User is at Work."

Figure 1:
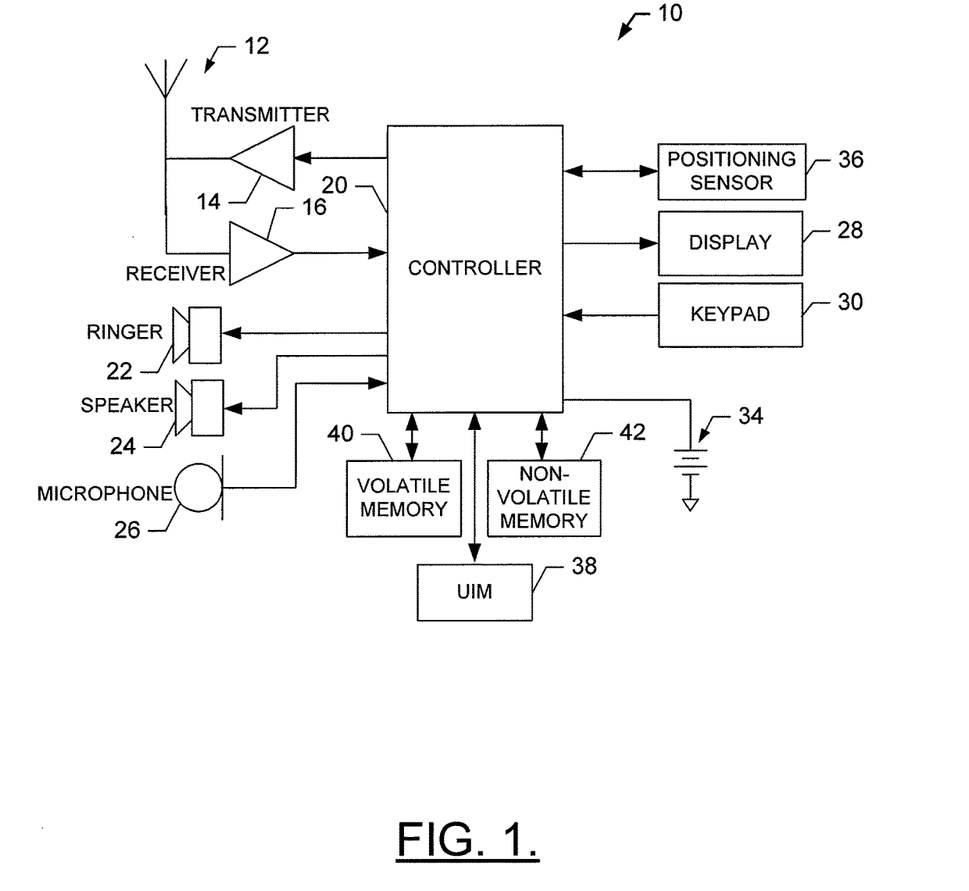
FIG. 1 is a schematic block diagram of a mobile terminal according to an exemplary embodiment of the present invention.

FIG. 1 illustrates a block diagram of a mobile terminal 10 that may implement and/or incorporate various aspects of exemplary embodiments of the present invention. It should be understood, however, that a mobile telephone as illustrated and hereinafter described is merely illustrative of one type of mobile terminal that may implement exemplary embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, mobile computers, laptop computers, cameras, video recorders, audio/video player, radio, GPS devices, or any combination of the aforementioned, and other types of voice and text communications systems, can readily employ embodiments of the present invention.

In addition, while several embodiments of the exemplary methods of the present invention may be performed or used by a mobile terminal 10, the exemplary methods may be employed by other than a mobile terminal (e.g., apparatus 200). Moreover, some of the apparatuses and methods of embodiments of the present invention will be described in conjunction with mobile communications applications. It should be understood, however, that the apparatuses and methods of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element that provides signals to and receives signals from the transmitter 14 and receiver 16, respectively. The signals may include or be representative of signaling information in accordance with the air interface standard of the applicable cellular system, and also user speech, received data and/or user generated data. In this regard, the mobile terminal 10 may be capable of operating with one or more air interface standards, communication protocols, modulation types, and/or access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9 generation (3.9G) wireless communication protocols, such as Evolved Universal Terrestrial Radio Access Network (E-UTRAN), with fourth-generation (4G) wireless communication protocols, Long Term Evolution (LTE) protocols, or the like. As an alternative (or additionally), the mobile terminal 10 may be capable of operating in accordance with non-cellular communication mechanisms. For example, the mobile terminal 10 may be capable of communication in a wireless local area network (WLAN), or other communication networks. Further, the mobile terminal 10 may communicate in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface that may include an output device such as a conventional earphone or speaker 24, a ringer 22, a microphone 26, a display 28, and/or a user input interface, all of which may be coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and/or other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as, optionally providing mechanical vibration as a detectable output.

The mobile terminal 10 may further include a positioning sensor 36 such as, for example, a global positioning system (GPS) module in communication with the controller 20. The positioning sensor 36 may be any means, device or circuitry for locating the position of mobile terminal 10. The positioning sensor 36 may include all hardware for locating the position of a mobile terminal 10. Alternatively or additionally, the positioning sensor 36 may utilize a memory device of the mobile terminal 10 to store instructions for execution by the controller 20 in the form of software necessary to determine the position of the mobile terminal 10. Although the positioning sensor 36 of this example may be a GPS module, the positioning sensor 36 may include or otherwise alternatively be embodied as, for example, an assisted global positioning system (Assisted-GPS) sensor, or a positioning client, which may be in communication with a network device to receive and/or transmit information, such as a sky or floor sensor, for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 36 includes a pedometer or inertial sensor. As such, the positioning sensor 36 may be capable of determining a location of the mobile terminal 10, with respect to, for example, longitudinal and latitudinal directions, and altitude direction of the mobile terminal 10, or a position relative to a reference point such as a destination or start point. Information from the positioning sensor 36 may then be communicated to a memory of the mobile terminal 10 or to another memory device to be stored as a position history or location information. Additionally, the positioning sensor 36 may be capable of utilizing the controller 20 to transmit/receive, via the transmitter 14/receiver 16, location information such as the position of the mobile terminal 10.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40, non-volatile memory 42 may include a cache area for temporary storage of data. The memories can store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which may determine an identity of the current cell, e.g., cell id identity or cell id information, with which the mobile terminal 10 is in communication.

Figure 2:
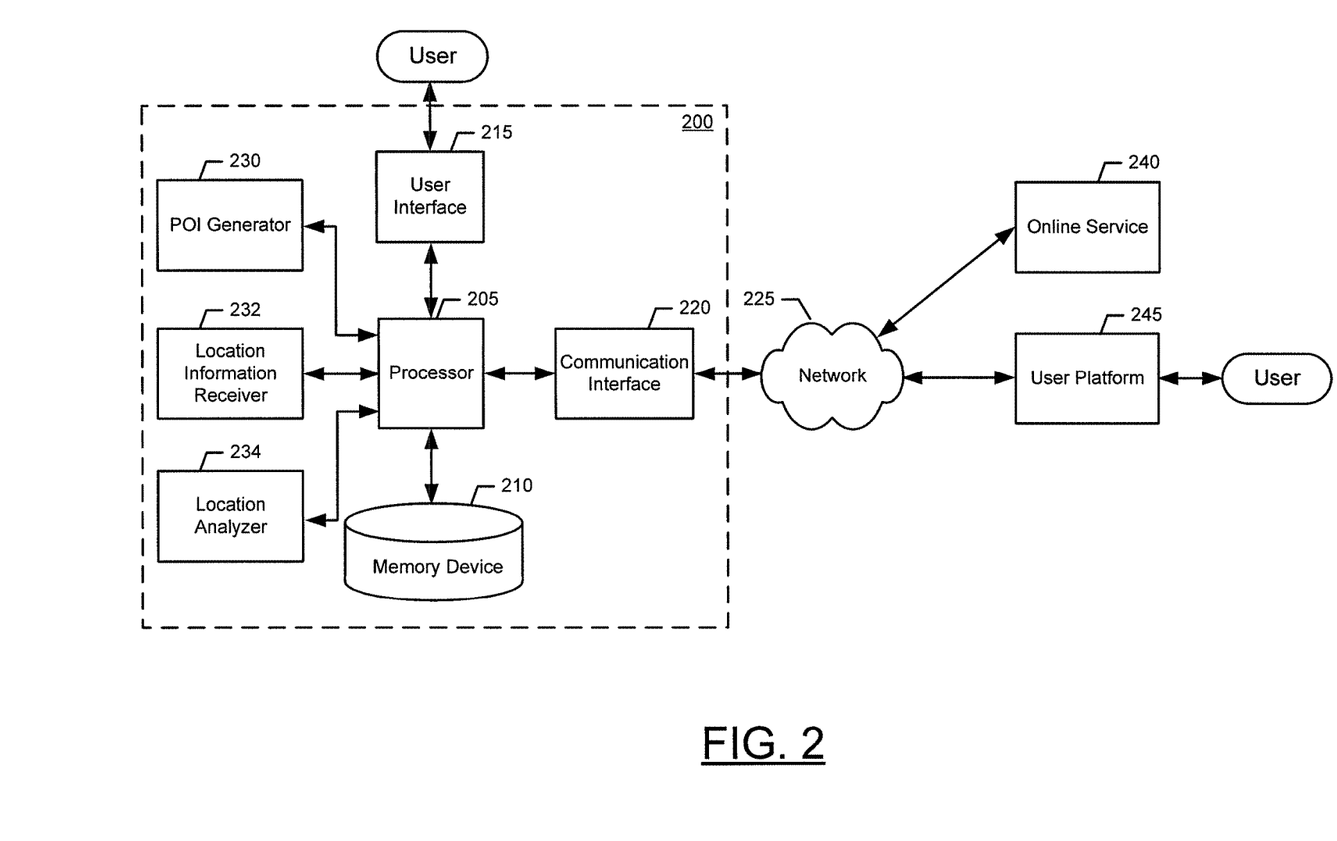
FIG. 2 illustrates a block diagram showing an apparatus for location sharing with associated network connectivity according to an exemplary embodiment of the present invention.

Referring now to FIG. 2, another exemplary apparatus 200 that may employ location sharing is described. Apparatus 200 may be embodied as a server or other network device including, for example, a mobile terminal, such as mobile terminal 10 of FIG. 1. In some exemplary embodiments, apparatus 200 may be embodied as a server of an online service. In embodiments where the apparatus 200 is embodied as a server of an online service, the apparatus 200, and the processor 205, may be configured to perform the functions associated with an online service as described herein, such as the online service 240 or the service 300.

The apparatus 200 may include or otherwise be in communication with a processor 205, a user interface 215, a communication interface 220, and a memory device 210. The memory device 210 may include, for example, volatile and/or non-volatile memory (e.g., volatile memory 40 and/or non-volatile memory 42). The memory device 210 may be configured to store information, data, applications, instructions, or the like for enabling the apparatus to carry out various functions in accordance with exemplary embodiments of the present invention. For example, the memory device 210 could be configured to buffer input data for processing by the processor 205. Additionally or alternatively, the memory device 210 could be configured to store instructions for execution by the processor 205. As yet another alternative, the memory device 210 may be one of a plurality of databases that store information in the form of static and/or dynamic information, for example, in association with location information, points of interest, geographic cells, geographic cell boundaries, point of interest associations, or the like.

The processor 205 may be embodied in a number of different ways. For example, the processor 205 may be embodied as various processing means including a microprocessor, a coprocessor, a controller (e.g., controller 20 from FIG. 1), or various other processing elements including integrated circuits such as, for example, an ASIC (application specific integrated circuit), FPGA (field programmable gate array), or a hardware accelerator. In an exemplary embodiment, the processor 205 may be configured to execute instructions stored in the memory device 210 or otherwise accessible to the processor 205.

The user interface 215 may be in communication with the processor 205 to receive an indication of a user input at the user interface 215 and/or to provide an audible, visual, mechanical, or other output to the user. As such, the user interface 215 may include, for example, a keyboard, a mouse, a joystick, a display such as a touch screen display, a microphone, a speaker, or other input/output mechanisms. In an exemplary embodiment in which the apparatus 200 is embodied as a server, the user interface 215 may be limited, or even eliminated.

The communication interface 220 may be embodied as any device or means embodied in either hardware, software, or a combination of hardware and software that is configured to receive and/or transmit data from/to a network and/or any other device or module in communication with the apparatus 200. In this regard, the communication interface 220 may include, for example, an antenna, a transmitter, a receiver, a transceiver and/or supporting hardware or software for enabling communications with network 225, which may be any type of wired or wireless network. For example, the communication interface may be configured to communicate in accordance with WLAN or Bluetooth, possibly with media access control (MAC), to name a few. The communication interface may also communicate using various mechanisms and protocols, including those described with respect to communications capabilities of the mobile terminal 10. Further, a MAC address may be used as a unique identifier for apparatus 200. Via the communication interface 220 and the network 225, the apparatus 200 may communicate with the online service 240 and/or the user platform 245.

The online service 240 may be any type of computing device for storing, retrieving, computing, transmitting, and receiving data. The online service 240 may be embodied as a web server, file server, or the like and may include a memory device, a processor, and a communication interface for communicating with the network 225. According to various embodiments, the online service 240 may operate a website that may allow users of the website to share information including location information or point of interest associations.

The user platform 245 may also be any type of device for storing, retrieving, computing, transmitting and receiving data. In some embodiments, user platform 245 may be embodied as a mobile terminal 10 of FIG. 1 or the like. The user platform may be associated with a user such that the location of the user platform may be associated with the location of the user. In some exemplary embodiments, user platform 245 may be merely representative of a plurality of user platforms, and as such any number of user platforms may be connected to network 225. In some embodiments, via the user platform 245, a user may access an exemplary online service using a browser, a dedicated application, or the like.

The POI (point of interest) generator 230, the location information receiver 232, and the location analyzer 234 of apparatus 200 may be any means or device embodied in hardware, software, or a combination of hardware and software, such as processor 205 operating under software control, that is configured to carry out the functions of the POI generator 230, the location information receiver 232, and the location analyzer 234, respectively, as described herein. In an exemplary embodiment, the processor 205 may include, or otherwise control the POI generator 230, the location information receiver 232, and the location analyzer 234. In various exemplary embodiments, the POI generator 230, the location information receiver 232, and/or the location analyzer 234 may reside on differing devices such that the functionality of one or more of the POI generator 230, the location information receiver 232, or the location analyzer 234 may be performed by a first device (e.g., an online service, a mobile terminal, or the like), and one or more of the POI generator 230, the location information receiver 232, or the location analyzer 234 may be performed by a second device (e.g., a mobile terminal, an online service, or the like).

In some embodiments, the system of FIG. 2 may be utilized for synchronization and/or sharing of data amongst the various network platforms. In this regard, the network platforms (e.g., the apparatus 200, the user platform 245, the online service 240, etc.) may be utilized by a user to access data. In some embodiments, the network entities may be used to access data associated with an online service account. Any type of data may be synchronized and/or shared amongst the platforms and made available for access. Types of data that may be synchronized and/or shared may include location information, point of interest associations, status information, content, user profile information, files (e.g., documents, photos, media content, etc.), contact information, access group membership, or the like. For example, point of interest associations may be accessed and/or synchronized (i.e., updated) via the user platform 245, the online service 240, or the apparatus 200. Upon updating point of interest associations or otherwise modifying data, the new information may be transmitted to a data storage device (e.g., the apparatus 200 or the online service 240) or otherwise made available to the various network platforms for subsequent access.

In this manner, data modified on one network platform may be available to another network platform. For example, the modified data may be automatically transmitted from the user platform 245 to the online service 240 or the apparatus 200 for synchronization purposes. As such, the user may later access the modified data via user platform 245 and/or a browser.

In some embodiments, a user may set synchronization parameters, which may identify types of data that should be synchronized and types of data that need not be synchronized. For example, a user may set the synchronization parameters to synchronize the defined points of interest, but may also set the synchronization parameters such that user profile information need not be synchronized.

Figure 3:
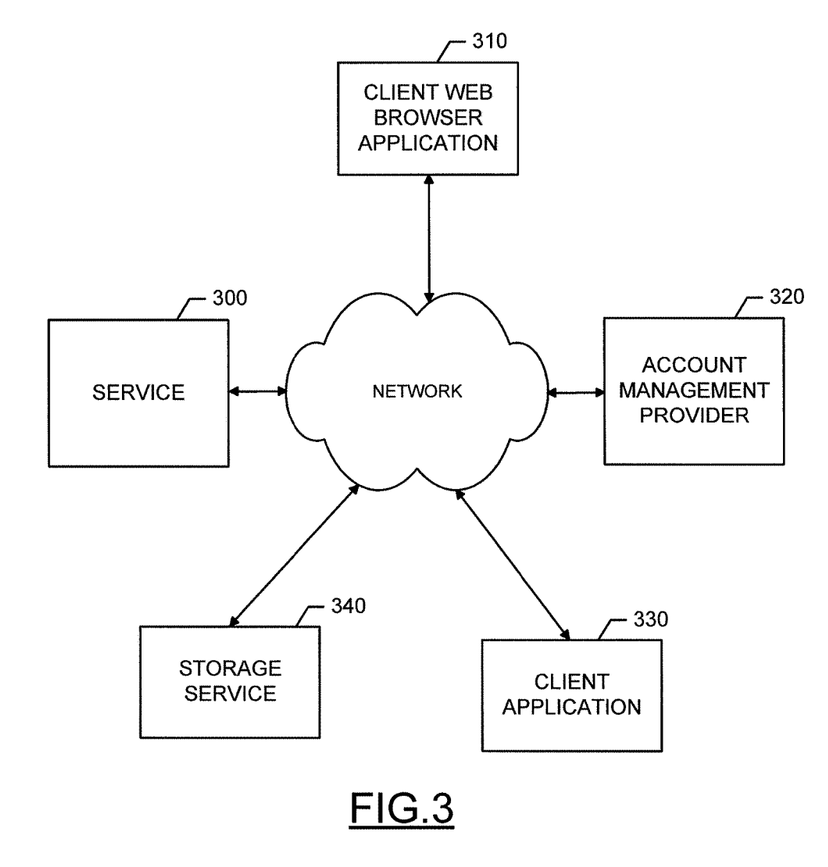
FIG. 3 illustrates an exemplary system of network entities for sharing various information including point of interest associations according to exemplary embodiments of the present invention.

In this regard, and referring now to FIG. 3, an embodiment of a system in accordance with aspects of the present invention is illustrated. The system of FIG. 3 may include a service 300, a client web browser application 310, an account management provider 320, a client application 330, and a storage service 340. The service 300, the client web browser application 310, the account management provider 320, the client application 330, and the storage service 340 may be interconnected via the illustrated network, which may operate in the same manner as network 225.

The service 300, the account management provider 320, and the storage service 340 may collectively represent an embodiment of the apparatus 200 of FIG. 2. In this regard, the service 300 may represent an internet or network service (e.g., a website, a social networking website, a blog website, a web feed, a widget, or the like) that may receive and interact with point of interest associations and/or the like in a manner described with respect to the POI generator 230, the location information receiver 232, the location analyzer 234, and the processor 205. Various types of data, such as, but not limited to, point of interest associations, may be synchronized with and/or otherwise transferred to and from the service 300. The service 300 may utilize the storage service 340 for storage and retrieval of data by the service 300. In various embodiments, the service 300 and/or storage service 340 may operate in the same manner as the memory device 210 and/or the online service 240. Further, the account management provider 320 may operate together with the various other network entities to perform account management and security features. In some embodiments, login information and passwords are first directed to the account management provider 320 for verification. Upon verification, the account management provider 320 may provide access to, and allow communications between, various network entities using, for example, a token or other access key.

Client application 330 may be a software or hardware application residing and operating on a platform, such as a computer, mobile terminal, or the like, that may be used to interact with the service 300. In some embodiments, the client application 330 may reside and operate on a platform, such as the apparatus 200, the user platform 245, or the like. The client application may be downloaded to and/or installed on the platform. In some embodiments, the client application 330 may be specifically tailored to interact with the service 300. Via the client application 330, the platform, and the user of the platform, may interact with the service 300 to send and receive data, such as point of interest associations, between the client application 330 and the service 300. The client application 330 may facilitate the gathering and storage of data for subsequent transmission to the service 300.

Similar to the client application 330, the client web browser application 310 may be a software or hardware application residing and operating on a platform, such as a computer, mobile terminal, or the like, that may be used to interact with the service 300. In this regard, the client web browser application 310 may be a generic network communication application for interacting with various network entities, including the service 300. In some embodiments, the client web browser application 310 may reside and operate on the apparatus 200, the user platform 245, or the like. Via the client web browser application 310, the platform, and the user of the platform, may interact with the service 300 to send and receive, as well as synchronize, data, such as point of interest associations, between the client web browser application 310 and the service 300. The client web browser application 310 may facilitate the gathering and storage of point of interest associations and other data for subsequent transmission to the service 300.

Referring back to FIG. 2 and apparatus 200, the POI generator 230 of apparatus 200 may be configured to define, or provide for defining, a point of interest. In this regard, a user may identify and name geographic areas or cells that the user may frequent or otherwise wish to define, such as, for example, home, work, or the like.

To define a point of interest, a name and a geographic cell may be defined. In this regard, the name may be a descriptor of the point of interest such as, "work," "home," "amusement park," "London," "California," or the like. To define the geographic cell associated with the point of interest, geographic cell boundaries may be defined. In this regard, the geographic cell boundaries may be a closed area, such as a geographic area, of any shape. Any coordinate system may be used to define the geographic cell boundaries such as, longitude and latitude, or any other geographic coordinate system. In some exemplary embodiments, a three dimensional coordinate system may be utilized. In this regard, the third dimension may be altitude, which may be used to indicate, for example, the floor of a building a user may be on. In addition to defining a name and a geographic cell, in some exemplary embodiments, defining a point of interest may also include defining a point of interest location. In this regard, a point of interest location may be a description of geographic point or specific location within a coordinate system.

In some exemplary embodiments, a point of interest may be defined through the use of an application (e.g., a mapping application) that may be implemented on, for example, the apparatus 200 or user platform 245. In this regard, a user may select geographic cell boundaries by, moving and/or manipulating a shape or a collection of lines over a map area and associating a name with the shape. Further, in some exemplary embodiments, a point of interest may be defined by selecting a point of interest location and determining the geographic cell boundaries based on the point of interest location. For example, using a selected point of interest location, boundaries may be determined to be a circular area having a center at the point of interest location with, for example, a one mile or one kilometer radius. Further, a selected point of interest location may be used to determine geographic cell boundaries that coincide with a city block, where the point of interest location is within the city block. Accordingly, various embodiments of the present invention may allow for the creation and defining of numerous points of interest, some of which may have intersecting geographic cell boundaries.

In some exemplary embodiments, points of interest may be retrieved from another application and/or device. In this regard, an application, such as a mapping or routing application may have landmarks or other identified locations identified. As such, the POI generator 230 may be configured to retrieve the landmarks and/or other identified locations from the external application and define points of interest based on information retrieved in association with the landmarks and/or other identified locations. In some exemplary embodiments, a user may select, and the POI generator 203 may receive, the selections of the landmarks or other identified locations. The landmarks or other identified locations may be defined as points of interest in response to being selected.

Further, in some exemplary embodiments of the present invention, additional attributes may be defined with respect to a point of interest. For example, attributes may be defined that can be used to control the distribution of the point of interest associations within an online service. In this regard, a point of interest may include a distribution attribute that may be used to define the point of interest as a public or private point of interest. A public point of interest may provide for sharing point of interest associations involving the defined point of interest with any user of the online service. On the other hand, a private point of interest may provide for sharing point of interest associations involving the defined point of interest with no users of the online service or select users of the online. In this regard, a point of interest may also include distribution attributes that may be directed to an access group. An access group may be a collection of users of an online service that may have access to the point of interest associations involving the defined point of interest. In this regard, an access group may include users in a contacts list, or users in a friends or other relationship group defined on the online service.

Figure 7A:
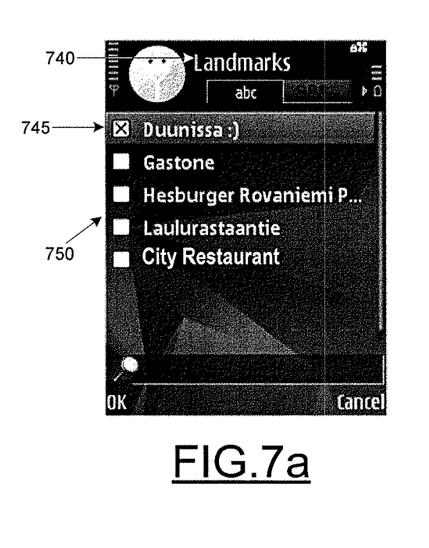
FIG. 7a illustrates a point of interest selection display interface according to exemplary embodiments of the present invention.

Further, in some exemplary embodiments, a use may be able to select the defined points of interest that the user desires to share when associations with the points of interest are generated. In this regard, the selection of a sharable point of interest may be received and stored as an attribute of the point of interest. FIG. 7a illustrates a point of interest selection display interface according to exemplary embodiments of the present invention. The point of interest selection display may facilitate the selection of points of interest by a user on, for example, the user terminal 245, apparatus 200, or the like. The point of interest selection display interface may include a title 740, which may provide a description of the point of interest selection display. For example, the title may state "Points of Interest" or "Landmarks." Further, the point of interest selection display may include a list of defined points of interest 750. A selector tool 745 may be moved through the list using, for example, a keypad, a touch screen, or some other user interface device, to select the point of interest. In some exemplary embodiments, in addition to moving to, onto, or over a point of interest in a list, an additional selection event may be performed in order to select a point of interest by clicking an selection key on the user interface or otherwise indicating to the user interface that the point of interest has been selected.

The location information receiver 232 may be configured to receive location information. In this regard, the location information may describe the location of a device, such as the apparatus 200, or the user platform 245, using any coordinate system. The location information may be captured by a positioning sensor, such as, for example, positioning sensor 36, and received by the location information receiver 232. In embodiments where apparatus 200 is embodied as a server, the location information may be captured by a remote device, such as, the user platform 245, and transmitted by the remote device for receipt by the location information receiver 232.

In some exemplary embodiments, the location information receiver 232 may receive location information from another device. The other device may be a known or trusted device. To determine whether the device is known or trusted a database of known or trusted devices may be generated and maintained on, for example, memory device 210. The known or trusted device list may be maintained with respect to a friends list, a contacts list, some other user defined list, or some other group or list. Upon locating a known or trusted device a communications connection between the devices, (e.g., a Bluetooth connection) may be used to receive the location information from the other device. Further, in some exemplary embodiments, known or trusted devices may also share points of interest and point of interest associations to indicate that a user is a the same location as the other device.

The location analyzer 234 may be configured to access the defined points of interest to perform various aspects of location sharing. In this regard, the location analyzer 234 may be configured to access points of interest, names of points of interest, and geographic cells associated with the points of interest. Further, the location analyzer may be configured to access public and/or private points of interest, and/or points of interest defined with respect to access groups. Additionally, in some exemplary embodiments, the location analyzer 234 may be configured to access points of interest that have been defined by selecting a point of interest location and determining the geographic cell boundaries based on the point of interest location.

The location analyzer 234 may be configured to determine whether the location described by the received location information is within the geographic cell boundaries of a defined point of interest. The location analyzer 234 may compare the coordinates of the location described by the location information to the coordinates of the geographic cell boundaries of each defined point of interest to determine whether the coordinates of the location described by the location information is within the geographic cell boundaries of any of the points of interest. Accordingly, the location analyzer 234 may be configured to associate the device with a point of interest in response to the location described by location information being within the geographic cell boundaries of the point of interest to determine a point of interest association.

Figure 4A:
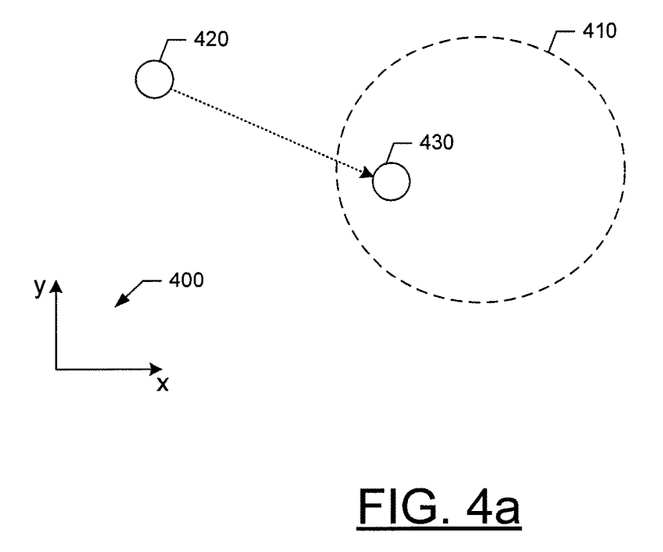
FIGS. 4a and 4b illustrate exemplary scenarios for describing location sharing according to exemplary embodiments of the present invention.

FIG. 4a depicts an exemplary scenario where a point of interest association may be generated. The scenario of FIG. 4a involves the location information of a device describing a location outside of the geographic cell boundaries of a point of interest, and then new location information being received indicating that the location of the device has moved within the boundaries of the point of interest and a point of interest association may be defined.

FIG. 4a includes a coordinate system 400 which may be any type of coordinate system (e.g., longitude and latitude). Initially, location information may be received indicating that a device is located at location 420, which is outside the geographic cell boundaries 410 of a point of interest. Since the location information of the device describes a location 420 that is outside the geographic cell boundaries 410 of the point of interest, no association between the device and the point of interest may be made.

Subsequently, the device may move to the location 430. Location information describing the location 430 may be received and analyzed to determine that the location information describes a location within the geographic cell boundaries 410. As such, a point of interest association may be made between the device and the point of interest. In some embodiments, the point of interest association may then be shared.

In some exemplary embodiments, points of interest may be defined that have intersecting geographic cell boundaries. As such, a situation may occur where the location information of a device describes a location that is within the geographic cell boundaries of more than one point of interest.

In this regard, in some embodiments of the present invention, the processor 205 of apparatus 200 may be configured to determine whether the location described by the location information is within the geographic cell boundaries of a first point of interest and the geographic cell boundaries of a second point of interest and/or additional points of interest. If the location information describes a location within geographic cell boundaries of two or more points of interest, the processor 205 may be configured to calculate the distances between the location described by the location information and the point of interest locations to determine the point of interest location that is closest to the location described by the location information. In this regard, the device may be associated with the point of interest that has the closest point of interest location to the location described by the location information.

Figure 4B:
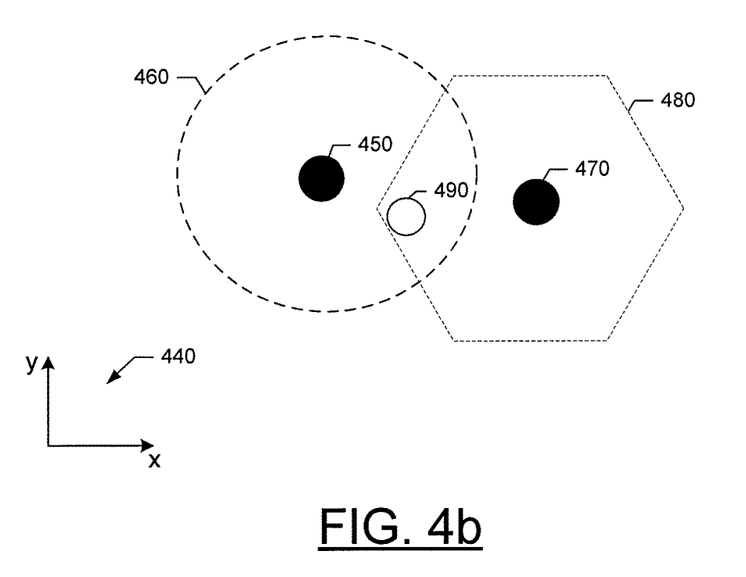

FIG. 4b depicts an exemplary scenario where the location information of a device describes a location that is within the geographic cell boundaries of two points of interest. The scenario of FIG. 4b is depicted within a coordinate system 440 which may be any type of coordinate system (e.g., longitude and latitude). A first point of interest may include a point of interest location 450 and geographic cell boundaries 460. A second point of interest may include a point of interest location 470 and geographic cell boundaries 480. Note that geographic cell boundaries 480 are in the shape of a hexagon to illustrate that geographic cell boundaries may be of any size and shape (regular or irregular).

The location information received with respect to FIG. 4b describes a location 490 of a device that is within the geographic cell boundaries 460 and geographic cell boundaries 480. Since the location 490 is within the geographic cell boundaries of both points of interest, measurements from the location 490 may be calculated to determine the distance between the location 490 and the point of interest location 450 and the distance between the location 490 and the point of interest 470. Since, in this exemplary scenario, the distance to point of interest location 450 is shorter, the device may be associated with the first point of interest.

Further, the processor 205 of the apparatus 200 may be configured to share the association between the device and the point of interest via an online service. The processor 205 may provide for presenting the point of interest associations to various users of the online service to thereby convey information regarding the location of the device and the associated user. In some embodiments, the point of interest associations may be transmitted to the online service to allow for sharing of the point of interest associations, or the online service may determine the point of interest associations locally and provide for sharing the results.

Figure 7B:
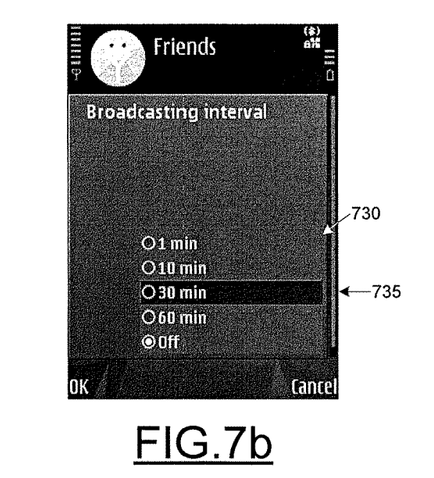
FIG. 7b illustrates a broadcasting interval display interface according to exemplary embodiments of the present invention.

In some exemplary embodiments, a predetermined time interval may be defined that may indicate how frequently the point of interest associations may be updated and shared with the online service. In this regard, FIG. 7b illustrates a broadcasting interval display interface according to exemplary embodiments of the present invention. In accordance with the broadcasting interval display of FIG. 7b, a user may select a time interval for updating or sharing point of interest associations. The broadcasting interval display may include a list of predefined time intervals 730 that may be selected from using selector tool 735. Selector tool 735 may be moved and/or make selections using, for example, a keypad, a touch screen, or some other user interface device.

Additionally, or alternatively, in some exemplary embodiments, the time interval may be dynamically defined based on various criteria. For example, in some exemplary embodiments, the time interval may be changed based on the rate of movement of the apparatus 200, as indicated by an accelerometer, or device with similar functionality, included with, and/or in communication with, the apparatus 200. In this regard, when the apparatus 200 is moving, the time interval may be shorter (i.e., more updates per unit time) and when the apparatus 200 is stationary the time interval may be longer (i.e., less updates per unit time).

Further, the processor may be configured to share point of interest associations based on defined distribution attributes. For example, if a point of interest involved in a point of interest association is defined as a public point of interest, then the point of interest association may be shared with any user of the online service. On the other hand, if a point of interest involved in a point of interest association is defined as a private point of interest, then the point of interest association may be shared with no user of the online service or some select users of the online service depending upon whether a private point of interest is defined with respect to some selected set of users. Further, in some exemplary embodiments, if a point of interest is defined with distribution attributes directed to an access group, the user that is requesting the point of interest association may need to be a member of the access group to receive the point of interest association. In this regard, the processor may be configured to share the point of interest association (i.e., the association between the device and the point of interest) with a requester in response to the requestor being a member of the access group.

Figure 7C:
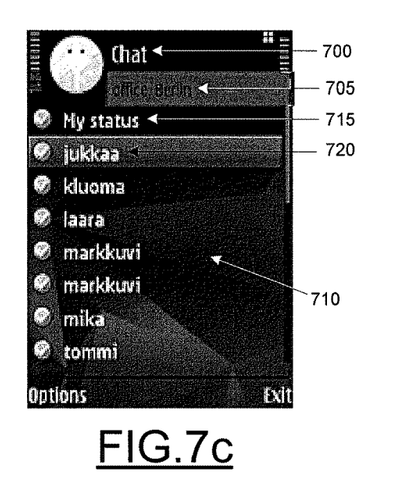
FIG. 7c illustrates a location sharing display interface according to exemplary embodiments of the present invention.

FIG. 7c illustrates a location sharing display interface according to exemplary embodiments of the present invention. The exemplary location sharing display interface may be present on for example, the user interface 245, the apparatus 200, or the like. The location sharing display interface may include a title 700, which may be the title of an application, such as, for example "chat." Further, the location sharing display interface may include a list of identities 710. The list of identities 710 may be derived from a contacts list, friends list, or other groups associated with a user. Further, a user may move the selection tool 720 (e.g., use a keypad, touch screen, or other user interface device) through the list of identities and as an identity is selected, a point of interest association may be presented in the point of interest association field 705. By selecting an identity within the list of identities 710, a request may be generated for the point of interest associations of the selected identity. According to various exemplary embodiments, a point of interest association may be shared and presented in the point of interest association field 705 based upon security or privacy settings associated with the selected identity. Further, in some exemplary embodiments, the point of interest association may be presented in a pop-up window. In some exemplary embodiments, the user status identity 715 may be selected to present the point of interest association of a device associated with the user in the point of interest association field 705.

Further, the processor 205 may be configured to implement a menu structure of predefined names for points of interest. In some exemplary embodiments, the menu structure of names may be utilized during definition of a point of interest. Further, the processor may be configured provide for selection of the predefined names from a menu structure where the selectable items can be listed. The predefined names may be associated with a location, or a general location, such that selection of the names with respect to the point of interest may facilitate describing the point of interest. Further in this regard, in some exemplary embodiments, when user subscribes to a service, such as an online service implemented by apparatus 200 or online service 240, the processor may be configured to receive a set of predefined location names by downloading location names selected by a user. Furthermore in some exemplary embodiments, the devices associated with users of the service (e.g., apparatus 200) may exchange the location names, and associated information, such as geographic cell boundaries and the like for defining a point of interest. By sharing location names and the associated information in this manner, users, possibly within a group or otherwise related, may have common location and point of interest names. In additional embodiments, users of a common application, such as a chat application, may have limited access to point of interests associations due to service limitations accessed only in predetermined locations. In these exemplary embodiments the location names available for access through the application may be only those location names recognized by the application.

Figure 5:
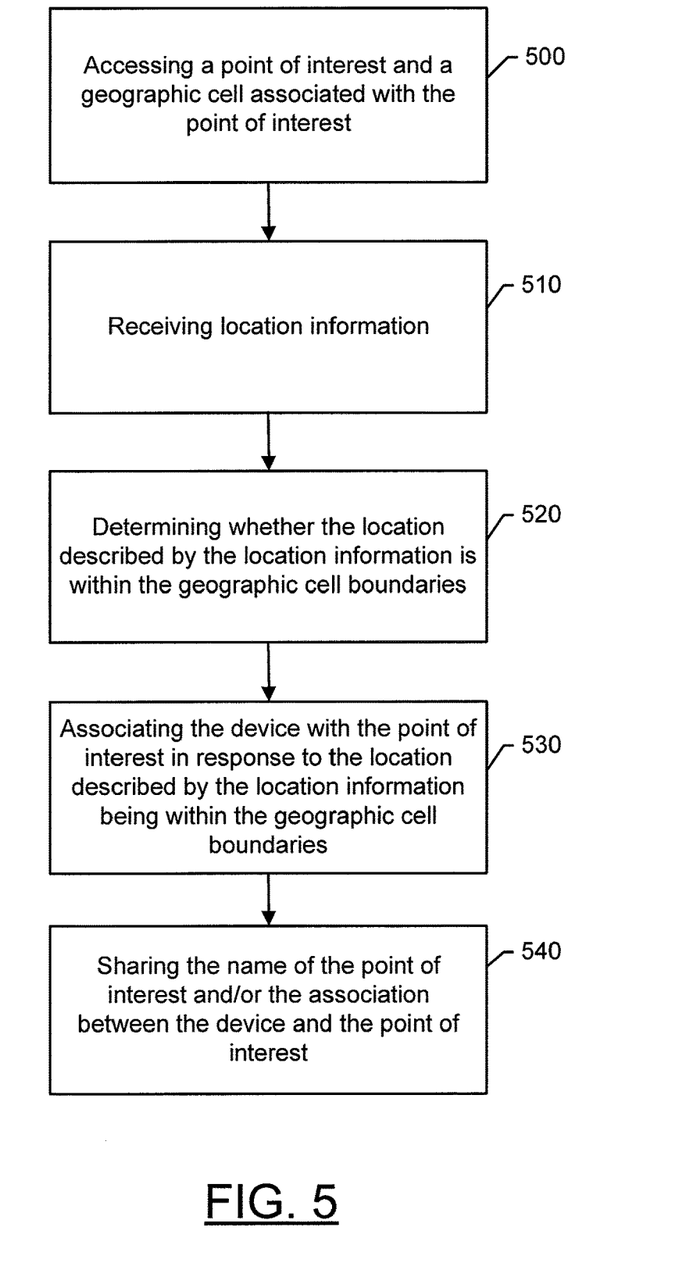
FIGS. 5 and 6 are flowcharts according to exemplary methods for location sharing according to exemplary embodiments of the present invention.
Figure 6:
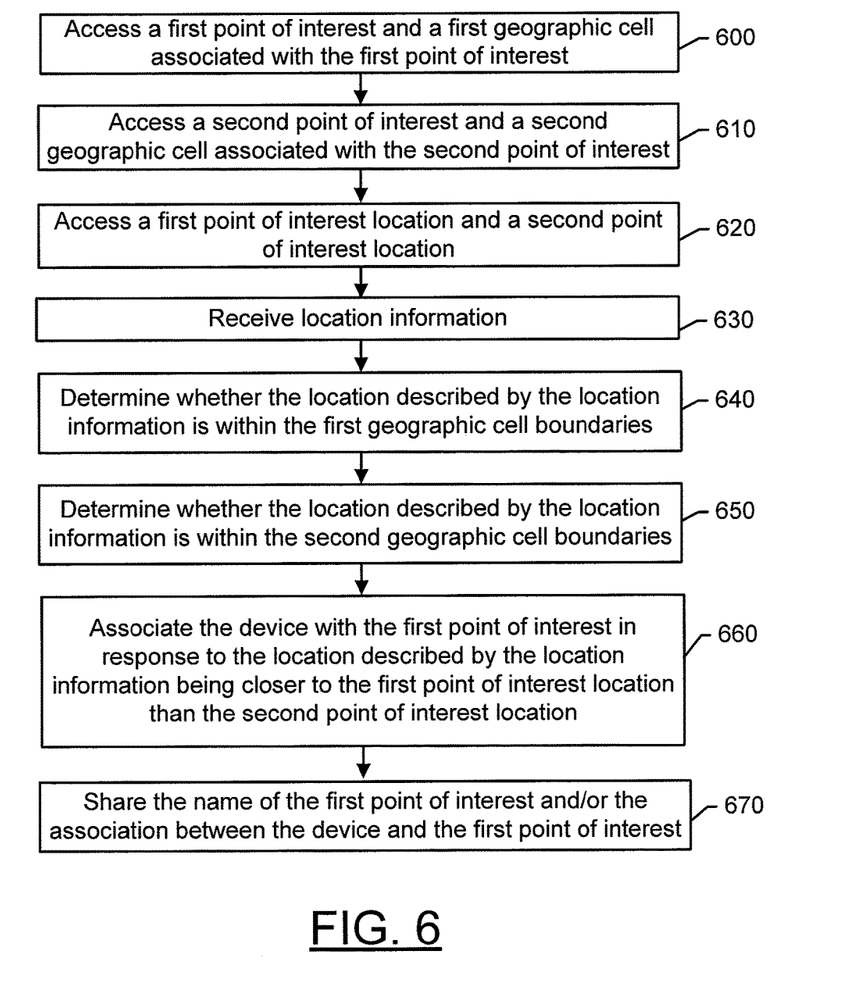

FIGS. 5 and 6 are flowcharts of a system, method, and program product according to exemplary embodiments of the invention. It will be understood that each block, step, or operation of the flowcharts, and combinations of blocks, steps or operations in the flowcharts, can be implemented by various means, such as hardware, firmware, and/or software including one or more computer program code instructions, program instructions, or executable program code instructions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (e.g., hardware such as processor 205 or controller 20) to produce a machine, such that the instructions which execute on the computer or other programmable apparatus create means for implementing the functions specified in the flowcharts block(s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions or steps, or combinations of special purpose hardware and computer instructions.

In this regard, one exemplary embodiment of a method for location sharing as illustrated in FIG. 5 may include accessing a point of interest and a geographic cell associated with the point of interest at 500. Further, in some exemplary embodiments, the name of a point of interest may be accessed. The geographic cell may include geographic cell boundaries. In some exemplary embodiments, accessing the point of interest may include accessing a point of interest defined as public or private. Further, in some exemplary embodiments, accessing the point of interest may include accessing a point of interest being defined with respect to an access group associated with the point of interest. Additionally, or alternately, in some embodiments, accessing a point of interest may include accessing a point of interest that has been defined by selecting a point of interest location and determining the geographic cell boundaries based on the point of interest location.

Additionally, the exemplary method may include receiving location information at 510. In this regard, the location information may describe a location of a device. Further, the method may include determining whether the location described by the location information is within the geographic cell boundaries of a point of interest at 520. The exemplary method may also include associating the device with the point of interest in response to the location described by the location information being within the geographic cell boundaries of a point of interest at 530.

Additionally, in some embodiments, the exemplary method may include sharing the name of the point of interest in response to the location described by the location information being within the first geographic cell boundaries at 540. In some exemplary embodiments, the association between the device and the point of interest, and/or the name, may be shared via an online service. In this regard, in some exemplary embodiments, sharing the name may include updating the association between the device and the point of interest at a predetermined time interval. Further, in some exemplary embodiments, sharing the association between the device and the point of interest may include sharing the association between the device and the point of interest in response to the point of interest being public. Additionally, or alternatively, in some exemplary embodiments, sharing the association between the device and the point of interest may include sharing the association between the device and the point of interest with a requester in response to the requester being a member of the access group.

Another exemplary embodiment of a method for location sharing as illustrated in FIG. 6 may include accessing a first point of interest and a first geographic cell associated with the first point of interest at 600. In this regard, the first geographic cell may include first geographic cell boundaries. At 610 the exemplary method may include accessing a second point of interest and a second geographic cell associated with the second point of interest. In this regard, the second geographic cell may include second geographic cell boundaries and second cell boundaries may intersect with the first geographic cell boundaries.

At 620, the exemplary method may include accessing a first point of interest location associated with the first point of interest and a second point of interest location associated with the second point of interest. Additionally, the exemplary method may include receiving location information at 630. In this regard, the location information may describe a location of a device. Further, the exemplary method may include determining whether the location described by the location information is within the first geographic cell boundaries at 640. The exemplary method may also include determining whether the location described by the location information is within the second geographic cell boundaries at 650.

At 660, the exemplary method may include associating the device with the first point of interest in response to the location described by the location information being within the first geographic cell boundaries and the second geographic cell boundaries and in response to the location described by the location information being closer to the first point of interest location than the second point of interest location. Further, the exemplary method may include sharing the name of the first point of interest and/or the association between the device and the first point of interest, for example, via an online service at 670.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   accessing, a name associated with a first point of interest and a first geographic cell associated with the first point of interest, the first geographic cell including first geographic cell boundaries;
   receiving location information, the location information describing a location of a device;
   determining, via a processor, whether the location described by the location information is within the first geographic cell boundaries;
   associating the device with the first point of interest in response to the location described by the location information being within the first geographic cell boundaries, wherein associating the device with the first point of interest includes associating the device with the first point of interest in response to receiving a user selection of the first point of interest from a selection display interface; and
   causing the name of the first point of interest to be shared in response to the location described by the location information being within the first geographic cell boundaries.

2. The method of claim 1, wherein causing the name to be shared includes updating the association between the device and the first point of interest at a predetermined time interval.

3. The method of claim 1, wherein accessing includes accessing the name associated with the first point of interest, the first point of interest being defined as public or private, and wherein causing the association between the device and the first point of interest to be shared includes causing the association between the device and the first point of interest to be shared in response to the first point of interest being public.

4. The method of claim 1, wherein accessing includes accessing the name associated with the first point of interest, the first point of interest being defined with respect to an access group associated with the first point of interest, and wherein causing the association between the device and the first point of interest to be shared includes causing the association between the device and the first point of interest to be shared with a requestor in response to the requestor being a member of the access group.

5. The method of claim 1, wherein accessing includes accessing the name associated with the first point of interest, the first point of interest having been defined by selecting a first point of interest location and determining the first geographic cell boundaries based on the first point of interest location.

6. The method of claim 1 further comprising:
   accessing a name associated with a second point of interest and a second geographic cell associated with the second point of interest, the second geographic cell including second geographic cell boundaries, the second geographic cell boundaries intersecting with the first geographic cell boundaries; and
   accessing a first point of interest location associated with the first point of interest and a second point of interest location associated with the second point of interest;
   wherein determining whether the location described by the location information is within the first geographic cell boundaries includes determining whether the location described by the location information is within the second geographic cell boundaries; and
   wherein associating the device with the first point of interest includes associating the device with the first point of interest in response to the location described by the location information being within the second geographic cell boundaries and in response to the location described by the location information being closer to the first point of interest location than the second point of interest location.

7. An apparatus comprising at least one processor and at least one memory including computer program code, the at least one memory and the computer program code configured to, with the at least one processor, direct the apparatus at least to:
access a name associated with a first point of interest and a first geographic cell associated with the first point of interest, the first geographic cell including first geographic cell boundaries;
receive location information, the location information describing a location of a device;
determine whether the location described by the location information is within the first geographic cell boundaries;
associate the device with the first point of interest in response to the location described by the location information being within the first geographic cell boundaries, wherein being directed to associate the device with the first point of interest includes being directed to associate the device with the first point of interest in response to receiving a user selection of the first point of interest from a selection display interface; and
cause the name of the first point of interest to be shared in response to the location described by the location information being within the first geographic cell boundaries.

8. The apparatus of claim 7, wherein the apparatus directed to cause the name of the first point of interest to be shared includes being directed to update the association between the device and the first point of interest at a predetermined time interval.

9. The apparatus of claim 7, wherein the apparatus directed to access includes being directed to access the name associated the first point of interest, the first point of interest being defined as public or private, and wherein the processor configured to cause the association between the device and the first point of interest to be shared includes being configured to cause the association between the device and the first point of interest to be shared in response to the first point of interest being public.

10. The apparatus of claim 7, wherein apparatus directed to access includes being directed to access the name associated with the first point of interest, the first point of interest being defined with respect to an access group associated with the first point of interest, and wherein the apparatus directed to cause the association between the device and the first point of interest to be shared includes being directed to cause the association between the device and the first point of interest to be shared with a requestor in response to the requestor being a member of the access group.

11. The apparatus of claim 7, wherein the apparatus directed to access includes being directed to access the name associated with the first point of interest, the first point of interest having been defined by selecting a first point of interest location and determining the first geographic cell boundaries based on the first point of interest location.

12. The apparatus of claim 7, wherein the apparatus is further directed to:
access a name associated with a second point of interest and a second geographic cell associated with the second point of interest, the second geographic cell including second geographic cell boundaries, the second geographic cell boundaries intersecting with the first geographic cell boundaries; and
access a first point of interest location associated with the first point of interest and a second point of interest location associated with the second point of interest; and
wherein the apparatus directed to determine whether the location described by the location information is within the first geographic cell boundaries includes being directed to determine whether the location described by the location information is within the second geographic cell boundaries; and
wherein the apparatus directed to associate the device with the first point of interest includes being directed to associate the device with the first point of interest in response to the location described by the location information being within the second geographic cell boundaries and in response to the location described by the location information being closer to the first point of interest location than the second point of interest location.

13. A computer program product comprising at least one non-transitory computer-readable storage medium having executable computer-readable program code instructions stored therein, the computer-readable program code instructions comprising:
first program code instructions configured to access a name associated with a first point of interest and a first geographic cell associated with the first point of interest, the first geographic cell including first geographic cell boundaries;
second program code instructions configured to receive location information, the location information describing a location of a device;
third program code instructions configured to determine whether the location described by the location information is within the first geographic cell boundaries;
fourth program code instructions configured to associate the device with the first point of interest in response to the location described by the location information being within the first geographic cell boundaries, wherein being configured to associate the device with the first point of interest includes being configured to associate the device with the first point of interest in response to receiving a user selection of the first point of interest from a selection display interface; and
fifth program code instructions configured to cause the name of the first point of interest to be shared in response to the location described by the location information being within the first geographic cell boundaries.

14. The computer program product of claim 13, wherein the fifth program code instructions configured to cause the name of the first point of interest to be shared includes being configured to update the association between the device and the first point of interest at a predetermined time interval.

15. The computer program product of claim 13, wherein the first program code instructions configured to access includes being configured to access the name associated with the first point of interest, the first point of interest being defined as public or private, and wherein the fifth program code instructions configured to cause the association between the device and the first point of interest to be shared includes being configured to cause the association between the device and the first point of interest to be shared in response to the first point of interest being public.

16. The computer program product of claim 13, wherein the first program code instructions configured to access includes being configured to access the name associated with the first point of interest, the first point of interest being defined with respect to an access group associated with the first point of interest, and wherein the fifth program code instructions configured to cause the association between the device and the first point of interest to be shared includes being configured to cause the association between the device and the first point of interest to be shared with a requestor in response to the requestor being a member of the access group.

17. The computer program product of claim 13, wherein the first program code instructions configured to access include being configured to access the name associated with the first point of interest, the first point of interest having been defined by selecting a first point of interest location and determining the first geographic cell boundaries based on the first point of interest location.

18. The computer program product of claim 13, wherein the computer-readable program code instructions further comprise:
    sixth program code instructions configured to access a name associated a second point of interest and a second geographic cell associated with the second point of interest, the second geographic cell including second geographic cell boundaries, the second geographic cell boundaries intersecting with the first geographic cell boundaries; and
    seventh program code instructions configured to access a first point of interest location associated with the first point of interest and a second point of interest location associated with the second point of interest; and
    wherein the third program code instructions configured to determine whether the location described by the location information is within the first geographic cell boundaries includes being configured to determine whether the location described by the location information is within the second geographic cell boundaries; and
    wherein the fourth program code instructions configured to associate the device with the first point of interest includes being configured to associate the device with the first point of interest in response to the location described by the location information being within the second geographic cell boundaries and in response to the location described by the location information being closer to the first point of interest location than the second point of interest location.

19. An apparatus comprising:
    means for accessing a name of a first point of interest and a first geographic cell associated with the first point of interest, the first geographic cell including first geographic cell boundaries;
    means for receiving location information, the location information describing a location of a device;
    means for determining whether the location described by the location information is within the first geographic cell boundaries;
    means for associating the device with the first point of interest in response to the location described by the location information being within the first geographic cell boundaries, wherein the means for associating the device with the first point of interest includes means for associating the device with the first point of interest in response to receiving a user selection of the first point of interest from a selection display interface; and
    means for causing the name of the first point of interest to be shared in response to the location described by the location information being within the first geographic cell boundaries.

20. The apparatus of claim 19, wherein means for accessing includes means for accessing the name associated with a first point of interest being defined with respect to an access group associated with the first point of interest, and wherein means for causing the association between the device and the first point of interest to be shared includes means for causing the association between the device and the first point of interest to be shared with a requestor in response to the requestor being a member of the access group.

* * * * *